United States Patent
Olausson et al.

(10) Patent No.: US 8,943,430 B2
(45) Date of Patent: Jan. 27, 2015

(54) OVERLAY NAVIGATION IN USER INTERFACE

(71) Applicants: Martin Olausson, Vasteras (SE);
Susanne Timsjo, Vasteras (SE)

(72) Inventors: Martin Olausson, Vasteras (SE);
Susanne Timsjo, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 14/084,269

(22) Filed: Nov. 19, 2013

(65) Prior Publication Data
US 2014/0082541 A1    Mar. 20, 2014

Related U.S. Application Data

(63) Continuation of application No. PCT/EP2011/058110, filed on May 19, 2011.

(51) Int. Cl.
*G06F 3/048* (2013.01)
*G06F 3/0484* (2013.01)
*G05B 23/02* (2006.01)

(52) U.S. Cl.
CPC .......... *G06F 3/0484* (2013.01); *G05B 23/0267* (2013.01); *G05B 2219/23136* (2013.01); *G05B 2219/23163* (2013.01); *G05B 2219/31472* (2013.01); *G05B 2219/31474* (2013.01)
USPC .......................................... 715/771; 715/772

(58) Field of Classification Search
CPC ....................................... G06F 3/048
USPC ........................................ 715/771
See application file for complete search history.

(56) References Cited

U.S. PATENT DOCUMENTS

| 5,283,560 | A | 2/1994 | Bartlett |
| 2007/0150810 | A1* | 6/2007 | Katz et al. ...................... 715/526 |
| 2008/0250312 | A1* | 10/2008 | Curtis ............................ 715/700 |
| 2008/0300698 | A1 | 12/2008 | Havekost et al. |

(Continued)

FOREIGN PATENT DOCUMENTS

| DE | 3930581 A1 | 3/1991 |
| EP | 0592921 A1 | 4/1994 |

(Continued)

OTHER PUBLICATIONS

International Preliminary Report on Patentability Application No. PCT/EP2011/058110 Completed: Apr. 25, 2013 16 pages.

(Continued)

*Primary Examiner* — Alvin Tan
*Assistant Examiner* — Xuyang Xia
(74) *Attorney, Agent, or Firm* — St. Onge Steward Johnston & Reens LLC

(57) ABSTRACT

A user interface (UI) for a process control system is disclosed. The UI is configured to be displayed on an electronic visual display unit connectable to the process control system. The UI includes a plurality of sub-UIs, each sub-UI being adapted to visually indicate at least a part of a process controlled by the process control system. A selection sub-UI is provided that can be selectively activated and deactivated by the user or operator, which selection sub-UI enables the user to at least temporarily select one or more of a plurality of visual representations corresponding to corresponding ones of the plurality of sub-UIs. When the selection sub-UI is deactivated, sub-UI corresponding to the selected one or more of the plurality of visual representations is displayed on the display unit.

21 Claims, 6 Drawing Sheets

(56) References Cited

U.S. PATENT DOCUMENTS

2009/0228839 A1   9/2009   Iga
2010/0017746 A1   1/2010   Husoy et al.
2010/0281386 A1*  11/2010  Lyons et al. .................. 715/731

FOREIGN PATENT DOCUMENTS

EP       0899566 A2   3/1999
EP       2204705 A1   7/2010

OTHER PUBLICATIONS

International Search Report and Written Opinion of the International Searching Authority Application No. PCT/EP2011/058110 Completed: Feb. 17, 2012; Mailing Date: Feb. 27, 2012 10 pages.

* cited by examiner

OVERLAY NAVIGATION IN USER INTERFACE

FIELD OF THE INVENTION

The present invention generally relates to process control systems. Specifically, the present invention relates to a user interface (UI) of a process control system and a method in a UI of a process control system for selectively displaying at least one of a plurality of sub-UIs on a display unit.

BACKGROUND OF THE INVENTION

In control systems for controlling and/or monitoring an industrial process, the operator typically controls/monitors the entire process or different parts of the process by means of one or more user interfaces (UIs), for example constituted by one or more graphic windows displayed on a display screen, each graphic window displaying process graphics. Such UIs may enable the operator to monitor the status of the different components of the process and/or control the operation of individual components of the process by means of user input provided to the UI. Providing user input to the UI may for example comprise providing instructions to a component of the process by means of a pointing device, such as a computer mouse, for manipulating objects in the UI. For example, appropriate parts in a graphic window displayed on a display screen may be selected and manipulated by means of 'clicking' them using the computer mouse.

A UI such as described above may be adapted to visually indicate to the user or operator the positions of the components included in the process relatively to each other. Thus, the UI may provide a display of a schematic arrangement of the components for providing the user with an overview of the process or a part of the process.

In some applications the number of parts or components in the process may be so large that all parts of the process cannot feasibly be shown to the user via a single UI at a time, for example in a single graphic window displayed on a display screen displaying process graphics. Hence, several UIs, or sub-UIs, i.e. UIs that are encompassed by or comprised in another 'main' UI, may be required in order to enable controlling and/or monitoring the entire process, but all of these UIs may not feasibly fit within the display screen at the same time. Therefore, in such a case the operator typically alternates between different UIs depending on which part of the process the operator wants to interact with or check status of.

For facilitating navigation between a relatively large number of different UIs comprising graphic windows displayed on a display screen, and also for providing the user with an overview of the entire process, thumbnails of the different graphic windows can be used, i.e. reduced size versions of the graphic windows or parts of them. Such thumbnails are typically displayed on the display screen. By selecting one of the thumbnails on the display screen, the user may bring up or put focus on the graphic window corresponding to the selected thumbnail, and then control and/or monitor the parts of the process indicated on the graphic window that has been brought up or put focus on.

However, even with the provision of such thumbnails, there is generally no user-intuitive manner in which the operator can navigate between different parts of the process using thumbnails that is consistent for different applications, e.g., control systems for different industrial processes. The navigation between different parts of the process in the UI of the process control system may accordingly become time-consuming and/or frustrating for the user.

It may become difficult for a user to get an adequate overview of the entire process since all of the thumbnails may not be displayed at the same time and/or in the same display.

For selecting the correct graphic window to be brought up or to put focus on, the user generally needs to recognize the schematic arrangement of the components in the thumbnail, since the user is in general familiar with the general appearance of the UIs on the display screen. However, reducing the size of a UI comprising a graphic window on the display screen may result in a thumbnail comprising a relatively small graphic object that is cluttered with graphics objects. This may make it difficult for the user to recognize any distinctive pattern in the thumbnail for recognizing which part or parts of the process that are indicated in the UI that corresponds to the thumbnail. This may particularly be the case when the number of different parts or components indicated in the graphic window of the UI is relatively large.

SUMMARY OF THE INVENTION

In view of the above discussion, a concern of the present invention is to provide an improved user interface (UI) of a process control system for controlling a process, with regards to navigation between different sub-UIs of the UI.

To address this concern and other concerns, a UI and a method are provided.

According to a first aspect of the present invention, there is provided a UI for a process control system. The UI is configured to be displayed on an electronic visual display unit connectable to the process control system.

The UI comprises a plurality of sub-UIs. Each sub-UI is adapted to visually indicate at least a part of a process controlled by the process control system.

The UI comprises a selection sub-UI, different from each of the above-mentioned plurality of sub-UIs. The selection sub-UI is configured to enable a user to selectively display at least one of the plurality of sub-UIs on the display unit. The selection sub-UI comprises a plurality of visual representations, wherein each of the plurality of visual representations corresponds to one of the plurality of sub-UIs.

The UI is configured to enable a user to selectively activate and deactivate the selection sub-UI by providing user input to the UI, wherein the selection sub-UI, when activated, is adapted to be at least momentarily displayed on the display unit at least partly superimposed, or overlaid, on at least one of the plurality of sub-UIs.

The selection sub-UI is adapted to enable the user to at least temporarily select at least one of the plurality of visual representations by providing user input to the selection sub-UI.

On a condition that the user has at least temporarily selected at least one of the plurality of visual representations, the selection sub-UI is adapted to re-display the plurality of visual representations on the display unit such that the selected at least one of the plurality of visual representations is positioned within a predetermined region on the selection sub-UI while maintaining the arrangement of the plurality of visual representations relatively to each other as displayed on the display unit.

On a condition that the selection sub-UI has been deactivated, the selection sub-UI is adapted to display sub-UI corresponding to the selected at least one of the plurality of visual representations on the display unit.

The gist of the present invention is to provide a selection sub-UI that can be selectively activated and deactivated by the user or operator, which selection sub-UI enables the user to at least temporarily select at least one of the plurality of visual representations.

The selection sub-UI is launched or activated by the user providing user input to the UI, for example by depressing a key on a keyboard or a pointing device, such as a computer mouse, connected to the UI. Once activated, the selection sub-UI is displayed at least partly overlaid or superimposed on one or more of the sub-UIs. The one or more of the sub-UIs at least partly overlaid or superimposed by the selection sub-UI may still be discernible to a user. For example, the one or more of the sub-UIs at least partly overlaid or superimposed by the selection sub-UI may be displayed partly visible or 'dimmed out' beneath the selection sub-UI. Thus, the selection sub-UI may comprise a semitransparent layer which once the selection sub-UI has been activated at least partly overlays one or more of the sub-UIs. The user can provide user input to the selection sub-UI in order to navigate between the visual representations of the selection sub-UI. The visual representations allow the user to match visual representations with the corresponding sub-UIs, i.e. identify or recognize which sub-UI, or which part or parts of the process that are indicated in the sub-UI, that corresponds to the visual representation. The visual representations may for example comprise thumbnails of the respective sub-UIs.

During navigation between the visual representations of the selection sub-UI, on a condition that the user has at least temporarily selected at least one of the plurality of visual representations, the selection sub-UI is adapted to re-display the plurality of visual representations on the display unit, possibly the selection sub-UI as a whole, in such a way that the selected at least one of the plurality of visual representations is positioned within a predetermined region on the selection sub-UI, while maintaining the arrangement of the plurality of visual representations relatively to each other as displayed on the display unit. In other words, the re-displayed visual representations may be displayed on the display unit in the same arrangement relatively to each other as immediately prior to the re-displaying taking place. That is, re-displaying the visual representations may entail displacing the visual representations as a group of objects on the display unit, as perceived by the user. By such a configuration the display of visual representations of the selection sub-UI on the display unit may be dynamically adapted during the navigation between the visual representations of the selection sub-UI by the user such that the currently, at least temporarily, selected one or more of the visual representations of the selection sub-UI, is always displayed in a dedicated region on the selection sub-UI. In this manner, the currently, at least temporarily, selected one or more of the visual representations of the selection sub-UI may continually be displayed at or in the proximity of a predetermined location on the display unit during the navigation procedure. Such a configuration may facilitate providing an overview of the entire process particularly in terms of the relation between the different sub-UIs visually represented in the selection sub-UI by the visual representations therein. For example, in case the plurality of visual representations are displayed on the display unit in a hierarchical manner such as in a tree structure, a navigation procedure as mentioned above may facilitate selection of the desired sub-UI in a quick and/or efficient manner since the user may become aware of any hierarchical interdependencies between the different sub-UIs by visual inspection of the arrangement of visual representations relatively to each other as displayed on the display unit.

Once the user has identified the desired visual representation and selected it, the user can deactivate the selection sub-UI, for example by releasing the key on the keyboard or pointing device being previously depressed. Then, the selected sub-UI or sub-UIs become displayed on the display unit. The display of the selected sub-UI or sub-UIs may replace a previously displayed sub-UI or sub-UIs on the display unit.

Each of the plurality of visual representations corresponding to one of the plurality of sub-UIs may entail that there is a one-to-one correspondence between the plurality of visual representations and the plurality of sub-UIs.

According to a second aspect of the present invention, there is provided a method in a UI for a process control system. The UI is configured to be displayed on an electronic visual display unit connectable to the process control system. The UI comprises a plurality of sub-UIs, each sub-UI being adapted to visually indicate at least a part of a process controlled by the process control system. The method is for selectively displaying at least one of the plurality of sub-UIs on the display unit.

A selection sub-UI comprising a plurality of visual representations, each of the plurality of visual representations corresponding to one of the plurality of sub-UIs, is at least momentarily displayed on the display unit at least partly superimposed, or overlaid, on at least one of the plurality of sub-UIs.

At least one of the plurality of visual representations is at least temporarily selected.

On a condition that at least one of the plurality of visual representations has been at least temporarily selected, the plurality of visual representations on the display unit are re-displayed such that the selected at least one of the plurality of visual representations is positioned within a predetermined region on the selection sub-UI while maintaining the arrangement of the plurality of visual representations relatively to each other as displayed on the display unit.

Sub-UI corresponding to the selected at least one of the plurality of visual representations is displayed on the display unit.

The method may comprise activating the selection sub-UI, which may cause the selection sub-UI to become at least momentarily displayed on the display unit at least partly superimposed, or overlaid, on at least one of the plurality of sub-UIs.

The method may comprise deactivating the selection sub-UI, which may cause sub-UI corresponding to the selected at least one of the plurality of visual representations to be displayed on the display unit.

The process control system may be adapted to determine a hierarchy of the at least a part of the process visually indicated in each of the plurality of sub-UIs, relatively to the respective at least a part of the process visually indicated in the other sub-UIs of the plurality of sub-UIs, in the process controlled by the process control system.

On basis of the determination by the process control system, the plurality of visual representations may be displayed on the display unit relatively to each other so as to indicate, e.g. to the user, the hierarchy associated with the at least a part of a process of the respective sub-UIs.

The plurality of visual representations may be displayed on the display unit relatively to each other such that the hierarchies of the at least a part of the process visually indicated in the respective sub-UIs associated with visual representations along a first direction are the same and the hierarchies of the at least a part of the process visually indicated in the respective sub-UIs associated with visual representations along a second direction, perpendicular to the first direction, are varying. The predetermined region may extend along the first direction, while the extension of the predetermined region is constant in the second direction.

For example, the dedicated region on the selection sub-UI in which the currently, at least temporarily, selected one or more of the visual representations of the selection sub-UI, is always displayed, may be positioned at a fixed vertical position relatively to the display unit. This may be particularly advantageous in the case where the plurality of visual representations are displayed on the display unit in a hierarchical manner such as in a tree structure. In this way, indication of father-child relations between sub-UIs, and consequently father-child relations between different parts of the process, to the user, which may aid the user in selecting the desired sub-UI, may be facilitated and/or improved.

When activated, the selection sub-UI may be adapted to be at least momentarily displayed on the display unit superimposed on the UI such that the UI is discernible to a user through the selection sub-UI.

To this end, the selection sub-UI may comprise a semi-transparent layer including the plurality of visual representations.

Each of the plurality of visual representations may correspond to one of the plurality of sub-UIs different from any sub-UI of the plurality of sub-UIs corresponding to other visual representations.

The selection sub-UI may be adapted to, on a condition that the selection sub-UI has been deactivated, stop displaying of the selection sub-UI on the display unit.

On a condition that the process control system has changed at least one visual representation responsive to corresponding sub-UI changes caused by change in aspect of the corresponding at least a part of the process, the at least one visual representation that has been changed may be re-displayed on the display unit.

In other words, the visual representations of the selection sub-UI may be dynamically adapted or updated responsive to changes in visual appearance of the sub-UIs resulting in changes in visual appearance of the corresponding visual representations as displayed on the display unit.

This may be performed automatically by monitoring changes in an aspect or aspects of the process or parts thereof.

In the context of the present application, by an aspect of a process or a part of a process it is meant operational state of one or more components of the process or part of the process, the number of components of the process or part of the process, etc. This list is not exhaustive.

The process control system may be configured to control and/or monitor a process in an industrial installation and/or in an installation for production, transmission and/or distribution of energy.

On a condition that the at least temporarily selected at least one of the plurality of visual representations has been at least temporarily selected for a predetermined period of time, sub-UI corresponding to the selected at least one of the plurality of visual representations may be displayed on the display unit such that the selection sub-UI is superimposed, or overlaid, on the displayed sub-UI.

In other words, in case a visual representation has been selected during a period of time exceeding a predetermined period of time, e.g. about 0.5 s, the sub-UI corresponding to the currently or momentarily selected visual representation is displayed on the display unit, e.g. in a dimmed out manner beneath the selection sub-UI.

By a visual representation having been selected during a period of time it is meant that the particular visual representation has been selected by the user, which has then become idle for the period of time, hence not selecting another one of the visual representations during the period of time.

The selection sub-UI may be adapted to display the plurality of visual representations on the display unit such that the plurality of visual representations are arranged in a tree structure when displayed on the display unit. Such a tree structure may in particular facilitate indicating hierarchical relationship between the different sub-UIs corresponding to the visual representations.

Each sub-UI of the plurality of sub-UIs may be adapted to visually indicate relationship between a plurality of components included in the at least a part of a process indicated by the sub-UI, wherein each component of the plurality of components is associated with at least one signal indicating an operational state of the component.

For each sub-UI of the plurality of sub-UIs, and for each of the plurality of components of the at least a part of a process indicated by the sub-UI, the at least one signal associated with the respective component may be retrieved. On basis of the at least one signal associated with the respective component, a visual indication representing the operational state of the component may be generated, wherein at least one characteristic of the visual indication depends on the at least one signal associated with the respective component.

For each sub-UI of the plurality of sub-UIs, the visual representation of the sub-UI may be generated on basis of the corresponding visual indications.

Hence, instead of utilizing, e.g., thumbnails of the different sub-UIs to visually represent them in the selection sub-UI, data associated with different components in a process controlled by the process control system indicative of the operational status of the respective component may be used to visualize the operational status of the components in each sub-UI on the display unit or display screen.

For each sub-UI of the plurality of sub-UIs, the visual representation of the sub-UI may be generated on basis of the corresponding visual indications such that, when the selection sub-UI is displayed on the display unit, the relationship between the visual indications in the visual representation of the sub-UI as displayed on the display unit corresponds to the relationship between the plurality of components included in the at least a part of the process visually indicated by the sub-UI as displayed on the display unit.

Thus, the visualization or visual representation of each sub-UI can be performed in such a manner that visual markers or indications of the components in the respective sub-UI replaces or supplements the process graphics of the actual components in the sub-UI, in such a way that the relative arrangement of the visual markers or indications in the visualization as displayed on the display screen corresponds to the relative arrangement of the components in the sub-UI as displayed on the display screen. In this way, the user or operator may by visually inspecting the visualization as displayed on the display screen readily recognize which sub-UI the visualization corresponds to.

The visualization can be performed in such a manner that the visual markers or indications of the components in the respective sub-UI can provide the user or operator with the operational status of the components in the sub-UI by visually inspecting the visualization as displayed on the display screen. In this way, the user may detect which part or parts of the process that require attention and relatively easily and quickly navigate to the sub-UI of that part or those parts of the process, by selecting the corresponding visualization or visual representation by means of the selection sub-UI.

Such visualization may represent an improvement over utilizing thumbnails. Namely, since a thumbnail is merely a reduced size version of the respective process graphics or sub-UI, a thumbnail does not allow a user to detect operational status of the process merely by visual inspection of the thumbnail on the display unit.

Each sub-UI may be further adapted to enable the user to control the operational state of the respective components by means of user input provided to the sub-UI.

Visual indications may for example comprise filled or unfilled circles of varying size, possibly with different fill colors or patterns. However, other shapes are contemplated such as square, star, triangular, pentagonal, etc. Different visual indications may have different shapes. In general, the at least one characteristic of each visual indication may comprise size, shape, pattern, brightness and/or color of the visual indication.

A change in at least one signal of the at least one signal associated with each of the plurality of components indicated by the plurality of sub-UIs may be sensed.

For each component associated with a signal in which a change has been detected, the visual indication representing the operational state of the component may be re-generated on basis of the signal which has been changed. Subsequently, the visual representation in which the re-generated visual indication is comprised may be updated and/or re-displayed.

The sensing and/or re-generation may be performed in an automated manner by means of monitoring the at least one signal associated with each of the plurality of components indicated by the plurality of sub-UIs.

A signal associated with a component of a plurality of components included in the at least a part of a process indicated by a sub-UI may for example comprise data measured at the respective component indicative of an operational state thereof.

The at least one signal may indicate an emergency, alarm and/or warning state of the respective component. The severity level of the emergency, alarm and/or warning state may be assessed on basis of the at least one signal indicating an emergency, alarm and/or warning state. On basis of the assessment, a characteristic of the visual indication corresponding to the component being associated with the at least one signal indicating an emergency, alarm and/or warning state may be set. Hence, a characteristic of the visual indication corresponding to the component being associated with the at least one signal indicating an emergency, alarm and/or warning state may be set based on how critical the emergency, alarm and/or warning is.

Setting the characteristic of the visual indication corresponding to the component associated with the at least one signal indicating an emergency, alarm and/or warning state may comprise setting the size of the visual indication on basis of the assessed severity level.

Further objects and advantages of the present invention are described in the following by means of exemplifying embodiments.

It is noted that the present invention relates to all possible combinations of features recited herein. Further features of, and advantages with, the present invention will become apparent when studying the following description. Those skilled in the art will realize that different features of the present invention can be combined to create embodiments other than those described in the following.

BRIEF DESCRIPTION OF THE DRAWINGS

Exemplifying embodiments of the invention will be described below with reference to the accompanying drawings, in which.

In the accompanying drawings, the same reference numerals denote the same or similar elements throughout the views.

DETAILED DESCRIPTION OF THE INVENTION

The present invention will now be described more fully hereinafter with reference to the accompanying drawings, in which exemplifying embodiments of the present invention are shown. This present invention may, however, be embodied in many different forms and should not be construed as limited to the embodiments set forth herein; rather, these embodiments are provided by way of example so that this disclosure will convey the scope of the invention to those skilled in the art. Furthermore, like numbers refer to like or similar elements or components throughout. The steps of any method disclosed herein do not have to be performed in the exact order disclosed, unless explicitly stated.

Figure 1:
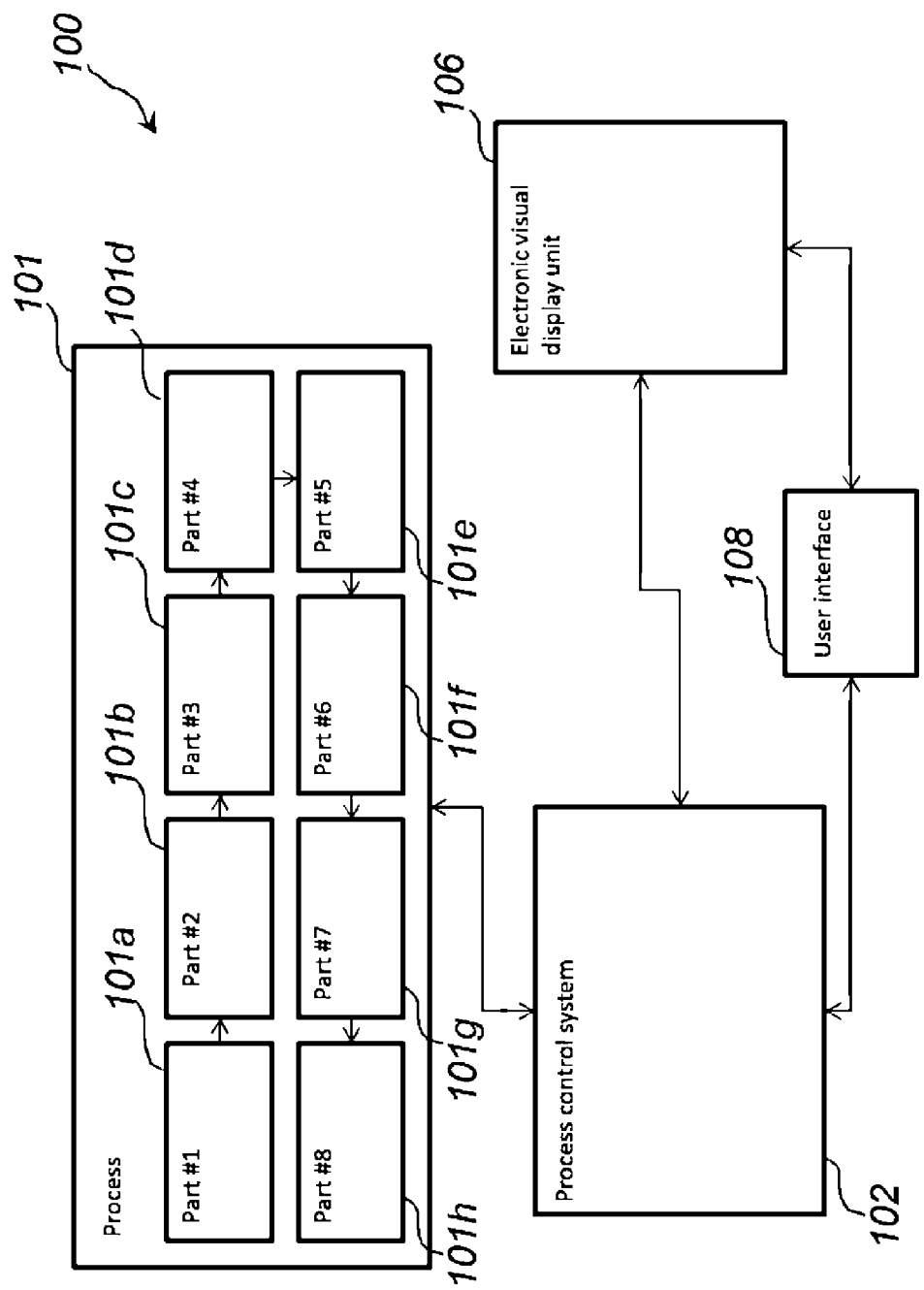
FIG. 1 is a schematic block diagram of a system in accordance with an exemplifying embodiment of the present invention.

Referring now to FIG. 1, there is shown a schematic block diagram of a system 100 in accordance with an exemplifying embodiment of the present invention.

The system 100 comprises a process 101 comprising several parts, sub-processes, or steps 101a-101h. Each part 101a-101h may refer to a specific device that is included in the overall installation embodying the process 101. A part 101a-101h of the process 101 may refer to a specific step or several steps that are part of the process 101.

In FIG. 1 it is indicated that the process parts 101a-101h are processed or executed in a serial manner one after the other. However, this is merely according to one example; the process 101 can comprise other configurations. For example, the process 101 may be embodied in a machine with the parts of the process being parts of the machine operating in concert or independently of each other. According to another example, the process 101 is a process taking place in an industrial installation and/or in an installation for production, transmission and/or distribution of energy.

In FIG. 1 there is shown eight parts of the process 101. The number of parts of the process 101 depicted in FIG. 1 is according to an example. It is to be understood that the process 101 may comprise any number of parts being a positive integer, such as one, two, three, four, five, ten, fifteen, twenty, or a hundred or more parts.

The process 101 is controlled by a process control system 102. To this end, the process control system 102 may be adapted to transmit control signals to and retrieve control signals from the process 101 or from each of the parts 101a-101h for monitoring the operational status of and/or controlling the operation of the process 101 or each of the parts 101a-101h.

Each part 101a-101h of the process 101 may comprise a plurality of components (not shown in FIG. 1). Each component may be associated with at least one signal indicating an operational state of the respective part 101a-101h. The at least one signal may for example be generated by the process control system 102 or by the component and/or part itself, and communicated to the process control system 102. The at least one signal associated with a component may for example comprise data measured at the component indicative of an operational state thereof.

The process control system 102 comprises at least one user interface (UI) 108 adapted to visually indicate the parts 101a-101h included in the process 101 controlled by the process control system 102. The system 101 comprises an electronic visual display unit 106 configured to display the UI 108 of the process control system 102. The UI 108 may be adapted to enable the user, or operator of the process 101, to control the operational state of the parts 101a-101h and/or the components associated with the respective parts 101a-101h by means of user input provided to the UI 108.

Figure 2A:
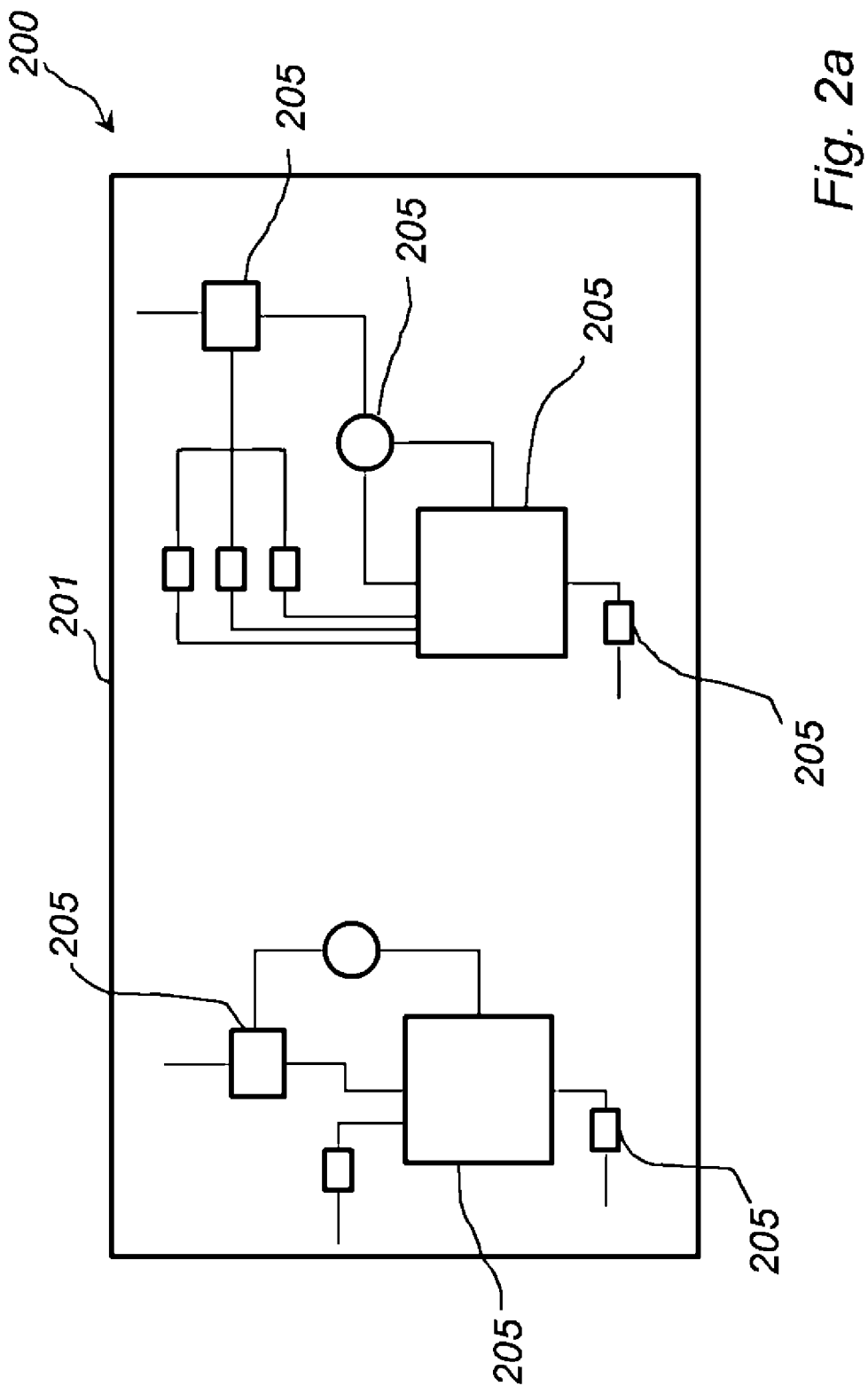
FIGS. 2a and 2b are schematic views of a user interface according to exemplifying embodiments of the present invention.

Referring now to FIG. 2a, there is shown a UI 200 according to an exemplifying embodiment of the present invention. The UI 200 is displayed on an electronic visual display unit or display screen (not shown in FIG. 2). The UI 200 comprises a sub-UI 201 comprising a graphics window displaying process graphics of a part of an industrial process comprising several components 205. The sub-UI 201 may enable a user or operator to monitor the status of the different components 205 of the process and/or control the operation of individual components 205 by means of user input provided to the sub-UI 201. Only a few of the components depicted in FIG. 2a are indicated by reference numerals 205. The process graphics schematically shown in the sub-UI 201 is according to an example for illustrating principles of the present invention. Providing user input to the sub-UI 201 may for example comprise providing instructions to a component of the process indicated on the sub-UI 201 by means of a pointing device, such as a computer mouse, for manipulating graphics objects in the UI 201. For example, appropriate portions of the graphic window 201 displayed on the display screen may be selected and manipulated by clicking them using the computer mouse.

The UI 200 comprises several additional sub-UIs (not shown in FIG. 2a) indicating other parts of the process, in a similar way as sub-UI 201 described in the foregoing. Hence, the UI 200 comprises a plurality of sub-UIs 201. According to the depicted example, only sub-UI 201 of the total number of sub-UIs comprised in the UI 200 is displayed. Hence, FIG. 2a indicates the situation where sub-UI 201 of the UI 200 is momentarily displayed on the display unit.

Figure 2B:
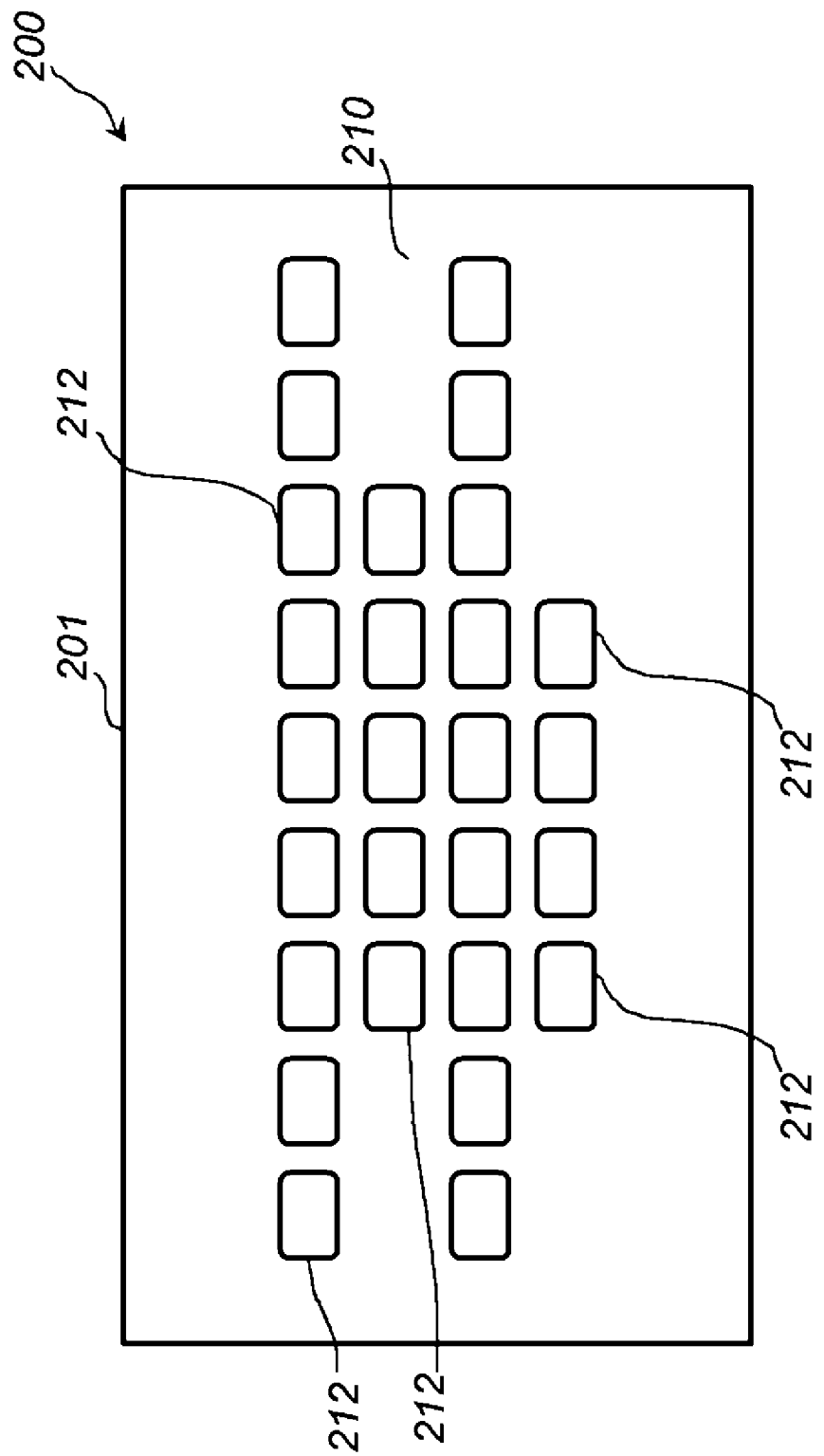

Referring now to FIG. 2b, there is shown a view of the UI 200 indicating the situation where the user or operator of the process has activated a selection sub-UI 210 comprised in the UI 200.

The selection sub-UI 210 can be launched or activated by the user providing user input to the UI 200, for example by depressing a key on a keyboard or a pointing device (not shown in FIG. 2b) connected to the UI 200.

The selection sub-UI 210 may be different from each of the other above-mentioned sub-UIs of the UI 200. The selection sub-UI 210 is configured to enable the user to selectively display at least one of the plurality of sub-UIs 201 on the display unit. The selection sub-UI 210 comprises a plurality of visual representations 212 of the sub-UIs 201. Each of the plurality of visual representations 212 corresponds to a corresponding one of the plurality of sub-UIs 201. There may be a one-to-one correspondence between the plurality of visual representations 212 and the plurality of sub-UIs 201. Only a few of the visual representations 212 depicted in FIG. 2b are indicated by reference numerals 212.

As shown in FIG. 2b, the plurality of visual representations 212 are arranged in a tree structure when displayed on the display unit. Such a tree structure arrangement may in particular facilitate indicating hierarchical relationship between the different sub-UIs 201 corresponding to the visual representations 212.

With further reference to FIG. 2b, the selection sub-UI 210 may comprise a semitransparent layer (not shown in FIG. 2b). Once the selection sub-UI 210 has been activated by the user, the semitransparent layer overlays the sub-UI 201 shown in FIG. 2a, with the sub-UI 201 discernible to a user beneath the selection sub-UI 210, as perceived by the user.

The user can provide user input to the selection sub-UI 210 in order to navigate between the different visual representations 212 of the selection sub-UI 210. By navigating between different visual representations 212 of the selection sub-UI 210 it may be meant consecutively at least momentarily selecting visual representations of the visual representations 212. Hence, the selection sub-UI 210 is adapted to enable the user to at least temporarily select and/or highlight at least one of the plurality of visual representations 212 by providing user input to the selection sub-UI 210. The navigation between different visual representations 212 of the selection sub-UI 210 can for example be effectuated by providing instructions to the selection sub-UI 210 by means of a keyboard or a pointing device (not shown in FIG. 2b), such as a computer mouse, connected to the UI 200.

The visual representations 212 may allow the user to match visual representations 212 with the corresponding sub-UIs 201, i.e. identify or recognize which sub-UI 201, or which part or parts of the process that are indicated in the sub-UI 201, that corresponds to the visual representation 212. Visual representations 212 may for example comprise thumbnails of the respective sub-UIs 201. Alternatively or optionally, visual representations 212 can be generated so as to indicate the operational status of components included in the part of the process indicated by the respective sub-UI 201, such as has been described in the foregoing.

As indicated above, the user may at least temporarily select at least one of the plurality of visual representations 212 while navigating between the different visual representations 212 of the selection sub-UI 210.

When at least one of the plurality of visual representations 212 has been at least temporarily selected by the user, the selection sub-UI 210 is adapted to re-display the plurality of visual representations 212 on the display unit in such a way that the selected at least one of the plurality of visual representations 212 is positioned within a predetermined region on the selection sub-UI 210, while maintaining the arrangement of the plurality of visual representations 212 relatively to each other as displayed on the display unit.

For example with reference to FIG. 2b, the selection sub-UI 210 may be adapted to re-display the plurality of visual representations 212 on the display unit in such a way that the currently selected at least one of the plurality of visual representations 212 is always displayed at a fixed vertical position on the display unit. In case the plurality of visual representations 212 are displayed on the display unit in a hierarchical manner such as in a tree structure as depicted in FIG. 2b, the desired sub-UI 201 may be selected by the user in a quick and/or efficient manner since the user may become aware of any hierarchical interdependencies between the different sub-UIs 201, by visually inspecting the arrangement of visual representations 212 relatively to each other as displayed on the display unit.

Once the user has identified the desired visual representation 212, corresponding to the sub-UI 201 that the user wants to display on the display unit, and selected it, the user can deactivate the selection sub-UI 210, for example by releasing the key on the keyboard or pointing device being previously depressed. Then, the selected sub-UI 201 or sub-UIs 201 become displayed on the display unit.

Figure 3A:
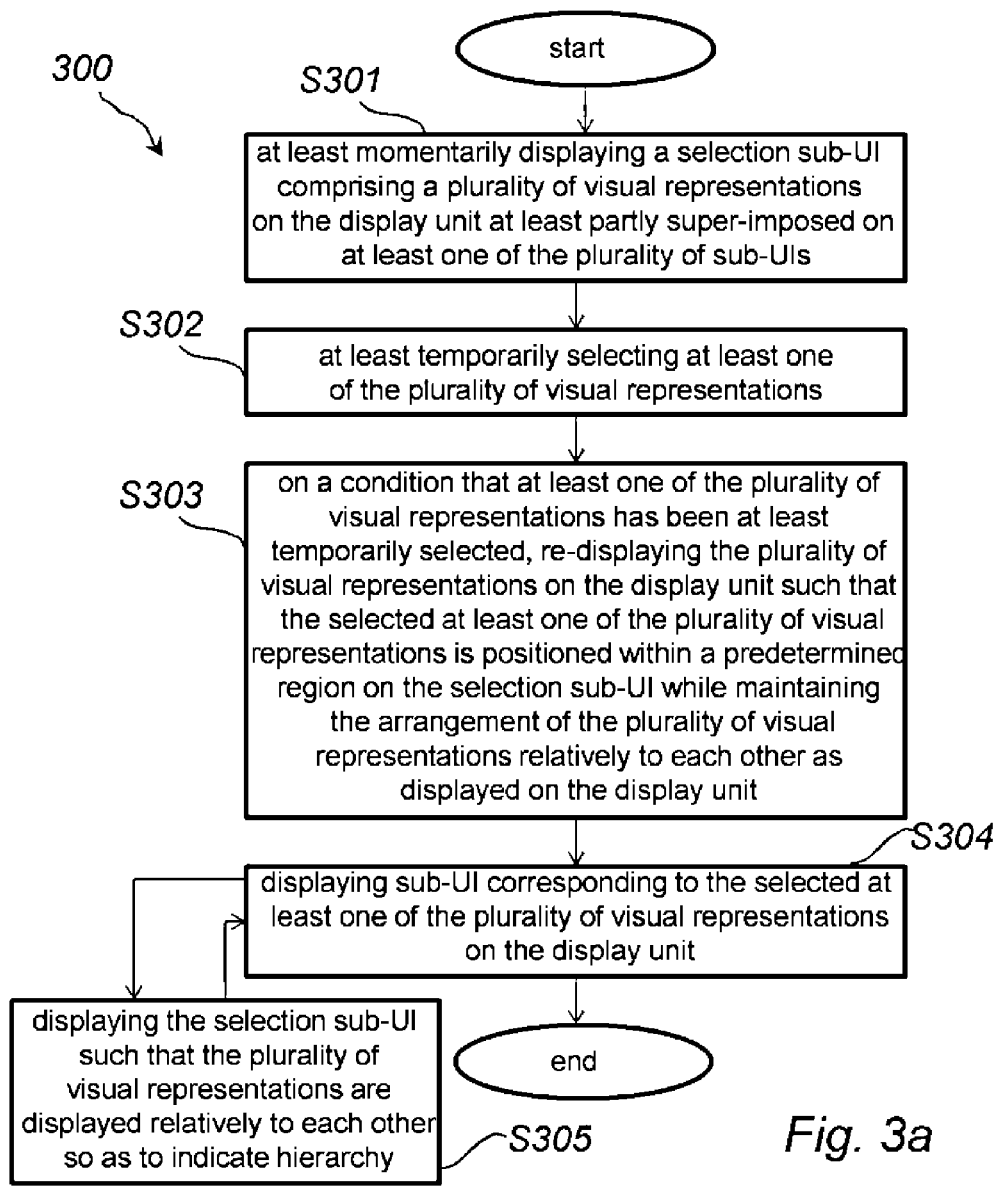
FIGS. 3a and 3b are schematic flowcharts of method steps in accordance with exemplifying embodiments of the present invention.

Referring now to FIG. 3a, there is shown a schematic flow-chart of a method 300 according to an exemplifying embodiment of the present invention.

The method 300 is carried out in and/or is intended for a UI for a process control system. The UI is configured to be displayed on an electronic visual display unit connectable to the process control system. The UI comprises a plurality of sub-UIs, wherein each sub-UI is adapted to visually indicate at least a part of a process controlled by the process control system.

The method 300 is for selectively displaying at least one of the plurality of sub-UIs on the display unit.

A selection sub-UI comprising a plurality of visual representations is at least momentarily displayed on the display unit at least partly superimposed on at least one of the plurality of sub-UIs, S301, each of the plurality of visual representations corresponding to one of the plurality of sub-UIs.

At least one of the plurality of visual representations is at least temporarily selected, S302.

On a condition that at least one of the plurality of visual representations has been at least temporarily selected, the plurality of visual representations on the display unit is re-displayed, S303, such that the selected at least one of the plurality of visual representations is positioned within a predetermined region on the selection sub-UI, while maintaining the arrangement of the plurality of visual representations relatively to each other as displayed on the display unit.

Sub-UI corresponding to the selected at least one of the plurality of visual representations on the display unit is/are displayed, S304.

The process control system may be adapted to determine a hierarchy of the at least a part of the process visually indicated in each sub-UI, relatively to the respective at least a part of the process visually indicated in the other sub-UIs, in the process controlled by the process control system.

The step S304 may optionally comprise step S305 comprising displaying the selection sub-UI on the display unit superimposed on the UI such that the plurality of visual representations are displayed relatively to each other so as to indicate the hierarchy associated with the at least a part of a process of the respective sub-UIs to the user, on basis of the determination by the process control system.

Figure 3B:
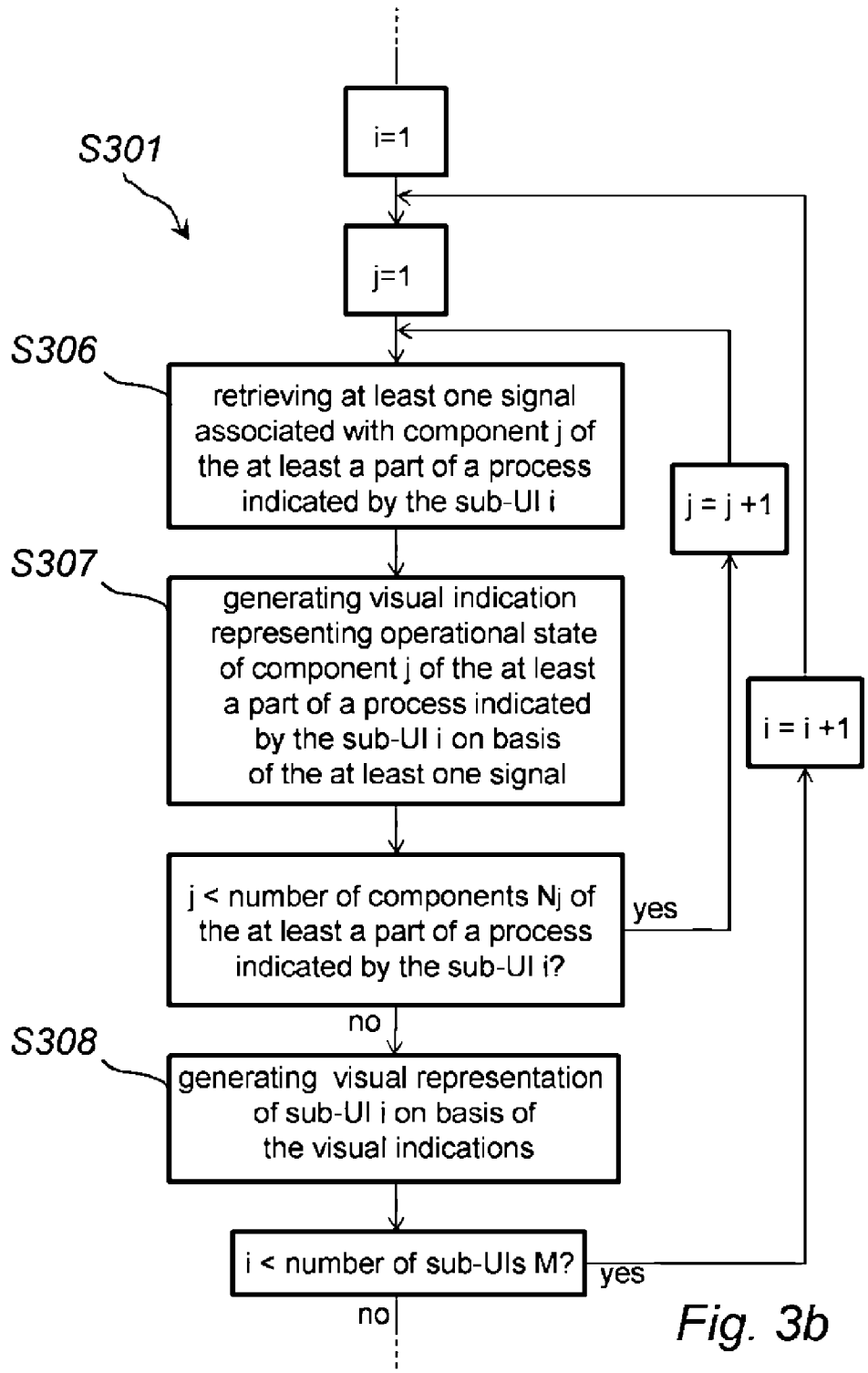

Referring now to FIG. 3b, there is shown a flowchart of step S301 described with reference to FIG. 3a.

Each sub-UI of the plurality of sub-UIs may be adapted to visually indicate relationship between a plurality of components included in the at least a part of a process indicated by the sub-UI. Each of M sub-UIs may indicate $N_i$ components, where i=1, . . . , M. $N_i$ and M are both positive integers. Each component of the plurality of components may be associated with at least one signal indicating an operational state of the component.

Starting at i=1, for the at least a part of a process indicated by sub-UI i the following steps S306, S307 and S308 may optionally be carried out.

Starting at j=1, the at least one signal associated with component j indicated in sub-UI i is retrieved, S306.

Both i and j are positive integers.

On basis of the at least one signal associated with component j, a visual indication representing the operational state of component j is generated, S307, wherein at least one characteristic of the visual indication depends on the at least one signal associated with component j.

After steps S306 and S307 have been performed for all $N_i$ components for the at least a part of a process indicated by sub-UI i, the visual representation of sub-UI i is generated on basis of the generated visual indications, S308.

Steps 306, S307 and S308 may be performed for each sub-UI of the M sub-Us, as indicated in FIG. 3b.

Figure 4:
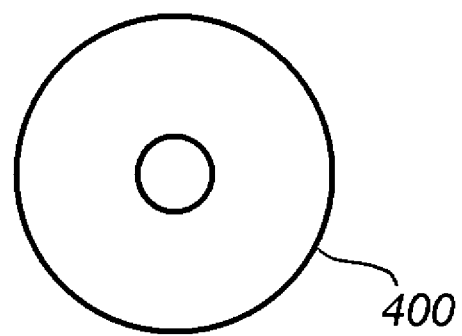
FIG. 4 is a schematic view of a computer-readable storage medium according to an exemplifying embodiment of the present invention.

Referring now to FIG. 4, there is shown a schematic view of a computer-readable storage medium 400 according to an exemplifying embodiment of the present invention, the storage medium 400 comprising a Digital Versatile Disc (DVD). On the computer-readable storage medium there is stored a computer program product adapted to, when executed in a processor unit, e.g. a general purpose processor in a computer, perform a method according to the present invention.

Although only one type of computer-readable storage medium has been described above with reference to FIG. 4, the present invention encompasses embodiments employing any other suitable type of computer-readable storage medium, such as, but not limited to, a non-volatile memory, a hard disk drive, a CD, a floppy disk, a flash memory, magnetic tape, a USB stick, a Zip drive, etc.

In conclusion, there is disclosed a UI for a process control system. The UI is configured to be displayed on an electronic visual display unit connectable to the process control system. The UI comprises a plurality of sub-UIs, each sub-UI being adapted to visually indicate at least a part of a process controlled by the process control system. A selection sub-UI is provided that can be selectively activated and deactivated by the user or operator, which selection sub-UI enables the user to at least temporarily select one or more of a plurality of visual representations corresponding to corresponding ones of the plurality of sub-UIs. When the selection sub-UI is deactivated, sub-UI corresponding to the selected one or more of the plurality of visual representations is displayed on the display unit.

While the invention has been illustrated and described in detail in the appended drawings and the foregoing description, such illustration and description are to be considered illustrative or exemplifying and not restrictive; the invention is not limited to the disclosed embodiments. Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measured cannot be used to advantage. Any reference signs in the claims should not be construed as limiting the scope.

What is claimed is:

1. A central processing unit having a user interface, UI, for a process control system, the UI being configured to be displayed on an electronic visual display unit connectable to the process control system, the UI comprising:
    a plurality of sub-UIs, each sub-UI being adapted to visually indicate at least a part of a process controlled by the process control system; and
    a selection sub-UI, different from each of said plurality of sub-UIs, configured to enable a user to selectively display at least one of the plurality of sub-UIs on the display unit, the selection sub-UI comprising a plurality of visual representations, each of the plurality of visual representations corresponding to one of the plurality of sub-UIs;
    the UI being configured to enable a user to selectively activate and deactivate the selection sub-UI by providing user input to the UI, wherein the selection sub-UI, when activated, is adapted to be at least momentarily displayed on the display unit at least partly superimposed on at least one of the plurality of sub-UIs;

the selection sub-UI being adapted to:
enable the user to at least temporarily select at least one of the plurality of visual representations by providing user input to the selection sub-UI;
in response to the user at least temporarily selecting at least one of the plurality of visual representations, re-display the plurality of visual representations on the display unit such that the selected at least one of the plurality of visual representations is positioned within a predetermined region on the selection sub-UI while maintaining the arrangement of the plurality of visual representations relatively to each other as displayed on the display unit; and
in response to the selection sub-UI having been deactivated, display the sub-UI corresponding to the selected at least one of the plurality of visual representations on the display unit;
wherein the process control system is adapted to determine a hierarchy of the at least a part of a process visually indicated in each of the plurality of sub-UIs, relatively to the respective at least a part of a process visually indicated in the other sub-UIs of the plurality of sub-UIs, in the process controlled by the process control system, the selection sub-UI being adapted to:
on basis of the determination by the process control system, display the plurality of visual representations on the display unit relatively to each other so as to indicate the hierarchy associated with the at least a part of a process of the respective sub-UIs; and
wherein the selection sub-UI is adapted to, in response to being at least momentarily displayed on the display unit, display the plurality of visual representations on the display unit such that the plurality of visual representations are arranged in a tree structure when displayed on the display unit.

2. The UI according to claim 1, wherein the selection sub-UI is adapted to display the plurality of visual representations on the display unit relatively to each other such that the hierarchies of the at least a part of a process visually indicated in the respective sub-UIs associated with visual representations along a first direction are the same and the hierarchies of the at least a part of a process visually indicated in the respective sub-UIs associated with visual representations along a second direction, perpendicular to the first direction, are varying, wherein the predetermined region extends along the first direction and an extension of the predetermined region is constant in the second direction.

3. The UI according to claim 1, wherein the selection sub-UI, when activated, is adapted to be at least momentarily displayed on the display unit superimposed on the UI such that the UI is discernible to a user through the selection sub-UI.

4. The UI according to claim 3, wherein the selection sub-UI comprises a semitransparent layer including the plurality of visual representations.

5. The UI according to claim 1, wherein each of the plurality of visual representations corresponds to one of the plurality of sub-UIs different from any sub-UI of the plurality of sub-UIs corresponding to other visual representations.

6. The UI according to claim 1, wherein the selection sub-UI is adapted to, in response to the selection sub-UI having been deactivated, stop displaying of the selection sub-UI on the display unit.

7. The UI according to claim 1, the selection sub-UI being further adapted to, in response to the process control system having changed at least one visual representation responsive to corresponding sub-UI changes caused by change in aspect of the corresponding at least a part of a process, re-display the at least one visual representation that has been changed on the display unit.

8. The UI according to claim 1, the selection sub-UI being further adapted to, in response to the at least temporarily selected at least one of the plurality of visual representations having been at least temporarily selected for a predetermined period of time, display the sub-UI corresponding to the selected at least one of the plurality of visual representations on the display unit such that the selection sub-UI is superimposed on the displayed sub-UI.

9. The UI according to claim 1, wherein each sub-UI of the plurality of sub-UIs is adapted to visually indicate relationship between a plurality of components included in the at least a part of a process indicated by the sub-UI, each component of the plurality of components being associated with at least one signal indicating an operational state of the component, the UI being adapted to, for each sub-UI of the plurality of sub-UIs:
for each of the plurality of components of the at least a part of a process indicated by the sub-UI:
retrieve the at least one signal associated with the respective component; and
on basis of the at least one signal associated with the respective component, generate a visual indication representing the operational state of the component, wherein at least one characteristic of the visual indication depends on the at least one signal associated with the respective component; and
generate the visual representation of the sub-UI on basis of the corresponding visual indications.

10. The UI according to claim 9, the UI being further adapted to, for each sub-UI of the plurality of sub-UIs:
generate the visual representation of the sub-UI on basis of the corresponding visual indications such that, when the selection sub-UI is displayed on the display unit, the relationship between the visual indications in the visual representation of the sub-UI as displayed on the display unit corresponds to the relationship between the plurality of components included in the at least a part of a process visually indicated by the sub-UI as displayed on the display unit.

11. A process control system comprising a user interface, UI, according to claim 1.

12. A method in a user interface, UI, for a process control system, the UI being configured to be displayed on an electronic visual display unit connectable to the process control system, the UI comprising a plurality of sub-UIs, each sub-UI being adapted to visually indicate at least a part of a process controlled by the process control system, the method for selectively displaying at least one of the plurality of sub-UIs on the display unit, the method comprising:
at least momentarily displaying a selection sub-UI, different from each of said plurality of sub-UIs, comprising a plurality of visual representations, each of the plurality of visual representations corresponding to one of the plurality of sub-UIs, on the display unit at least partly superimposed on at least one of the plurality of sub-UIs;
at least temporarily selecting at least one of the plurality of visual representations;
in response to at least one of the plurality of visual representations having been at least temporarily selected, re-displaying the plurality of visual representations on the display unit such that the selected at least one of the plurality of visual representations is positioned within a predetermined region on the selection sub-UI while maintaining the arrangement of the plurality of visual representations relatively to each other as displayed on the display unit; and in response to the selection sub-UI having been deactivated, displaying the sub-UI corresponding to the selected at least one of the plurality of visual representations on the display unit;

wherein the process control system is adapted to determine a hierarchy of the at least a part of a process visually indicated in each sub-UI, relatively to the respective at least a part of a process visually indicated in the other sub-UIs, in the process controlled by the process control system, the method further comprising:

on basis of the determination by the process control system, displaying the selection sub-UI on the display unit superimposed on the UI such that the plurality of visual representations are displayed relatively to each other so as to indicate the hierarchy associated with the at least a part of a process of the respective sub-UIs; and wherein the selection sub-UI is adapted to, in response to being at least momentarily displayed on the display unit, display the plurality of visual representations on the display unit such that the plurality of visual representations are arranged in a tree structure when displayed on the display unit.

13. The method according to claim 12, further comprising: displaying the selection sub-UI on the display unit superimposed on the UI such that the plurality of visual representations are displayed on the display unit relatively to each other such that the hierarchies of the at least a part of a process visually indicated in the respective sub-UIs associated with visual representations along a first direction are the same and the hierarchies of the at least a part of a process visually indicated in the respective sub-UIs associated with visual representations along a second direction, perpendicular to the first direction, are varying, wherein the predetermined region extends along the first direction and an extension of the predetermined region is constant in the second direction.

14. The method according to claim 12, wherein each sub-UI of the plurality of sub-UIs is adapted to visually indicate relationship between a plurality of components included in the at least a part of a process indicated by the sub-UI, each component of the plurality of components being associated with at least one signal indicating an operational state of the component, the method further comprising, for each sub-UI of the plurality of sub-UIs:

for each of the plurality of components of the at least a part of a process indicated by the sub-UI:
retrieving the at least one signal associated with the respective component; and
on basis of the at least one signal associated with the respective component, generating a visual indication representing the operational state of the component, wherein at least one characteristic of the visual indication depends on the at least one signal associated with the respective component; and
generating the visual representation of the sub-UI on basis of the corresponding visual indications.

15. The method according to claim 14, the method further comprising, for each sub-UI of the plurality of sub-UIs:
generating the visual representation of the sub-UI on basis of the corresponding visual indications such that, when the selection sub-UI is displayed on the display unit, the relationship between the visual indications in the visual representation of the sub-UI as displayed on the display unit corresponds to the relationship between the plurality of components included in the at least a part of a process visually indicated by the sub-UI as displayed on the display unit.

16. The method according to claim 14, wherein the at least one characteristic comprises size, shape, pattern, brightness and/or color of the respective visual indication.

17. The method according to claim 14, further comprising:
sensing a change in at least one signal of the at least one signal associated with each of the plurality of components indicated by the plurality of sub-UIs; and
for each component being associated with a signal in which a change has been detected, re-generating the visual indication representing the operational state of the component on basis of said signal which has been changed.

18. The method according to claim 17, wherein the sensing and/or re-generation is performed in an automated manner by means of monitoring the at least one signal associated with each of the plurality of components indicated by the plurality of sub-Us.

19. The method according to claim 14, wherein the at least one signal indicates an emergency, alarm and/or warning state of the respective component, the method further comprising:
assessing a severity level of the emergency, alarm and/or warning state on basis of the at least one signal indicating the emergency, alarm and/or warning state; and
on basis of the assessing, setting a characteristic of the visual indication corresponding to the component being associated with the at least one signal indicating the emergency, alarm and/or warning state.

20. The method according to claim 19, wherein setting the characteristic of the visual indication corresponding to the component being associated with the at least one signal indicating an emergency, alarm and/or warning state comprises setting a size of the visual indication on basis of the assessed severity level.

21. A non-transitory computer-readable storage medium on which there is stored a computer program product adapted to, when executed in a processor unit, perform a method in a user interface, UI, for a process control system, the UI being configured to be displayed on an electronic visual display unit connectable to the process control system, the UI comprising a plurality of sub-UIs, each sub-UI being adapted to visually indicate at least a part of a process controlled by the process control system, the method for selectively displaying at least one of the plurality of sub-UIs on the display unit, the method comprising:

at least momentarily displaying a selection sub-UI, different from each of said plurality of sub-UIs, comprising a plurality of visual representations, each of the plurality of visual representations corresponding to one of the plurality of sub-UIs, on the display unit at least partly superimposed on at least one of the plurality of sub-UIs;

at least temporarily selecting at least one of the plurality of visual representations;

in response to at least one of the plurality of visual representations having been at least temporarily selected, re-displaying the plurality of visual representations on the display unit such that the selected at least one of the plurality of visual representations is positioned within a predetermined region on the selection sub-UI while maintaining the arrangement of the plurality of visual representations relatively to each other as displayed on the display unit; and in response to the selection sub-UI having been deactivated, displaying the sub-UI corresponding to the selected at least one of the plurality of visual representations on the display unit;

wherein the process control system is adapted to determine a hierarchy of the at least a part of a process visually indicated in each sub-UI, relatively to the respective at least a part of a process visually indicated in the other sub-UIs, in the process controlled by the process control system, the method further comprising:
on basis of the determination by the process control system, displaying the selection sub-UI on the display unit superimposed on the UI such that the plurality of visual representations are displayed relatively to each other so as to indicate the hierarchy associated with the at least a part of a process of the respective sub-UIs; and wherein the selection sub-UI is adapted to, in response to being at least momentarily displayed on the display unit, display the plurality of visual representations on the display unit such that the plurality of visual representations are arranged in a tree structure when displayed on the display unit.

* * * * *